United States Patent
Marion et al.

(10) Patent No.: US 7,605,187 B2
(45) Date of Patent: Oct. 20, 2009

(54) METHOD FOR TEMPORARILY INTERRUPTING A FISCHER-TROPSCH REACTION IN A THREE-PHASE BED REACTOR

(75) Inventors: Marie Claire Marion, Vernaison (FR); Francois Hugues, Vernaison (FR)

(73) Assignees: Institut Francais du Petrol, Rueil Malmaison Cedex (FR); ENI S.p.A., Rome (IT)

( * ) Notice: Subject to any disclaimer, the term of this patent is extended or adjusted under 35 U.S.C. 154(b) by 0 days.

(21) Appl. No.: 11/792,125

(22) PCT Filed: Nov. 16, 2006

(86) PCT No.: PCT/FR2005/002848

§ 371 (c)(1),
(2), (4) Date: Apr. 16, 2008

(87) PCT Pub. No.: WO2006/061471

PCT Pub. Date: Jun. 15, 2006

(65) Prior Publication Data

US 2008/0262112 A1    Oct. 23, 2008

(51) Int. Cl.
*C07C 27/00* (2006.01)
(52) U.S. Cl. .................. 518/700; 518/715; 518/728
(58) Field of Classification Search ................ 518/700, 518/715, 728
See application file for complete search history.

(56) References Cited

U.S. PATENT DOCUMENTS

| 5,728,918 A | 3/1998 | Nay et al. |
| 6,512,017 B1 | 1/2003 | Steynberg et al. |
| 2004/0147623 A1 | 7/2004 | Front Freide |

FOREIGN PATENT DOCUMENTS

| GB | 2 223 237 A | 4/1990 |
| WO | WO 02/096834 A2 | 12/2002 |

*Primary Examiner*—Jafar Parsa
(74) *Attorney, Agent, or Firm*—Millen, White, Zelano & Branigan P.C.

(57) ABSTRACT

A process for temporarily interrupting a Fischer-Tropsch type reaction carried out on a feed comprising at least carbon monoxide and hydrogen is carried out in a three-phase reaction zone comprising a liquid phase, a gas phase and solid catalyst particles maintained in suspension, said process comprising a step a) for interrupting the reaction and a step b) for restarting said reaction, during which the solid catalyst particles are maintained in suspension in the reaction zone;

Figure 1:
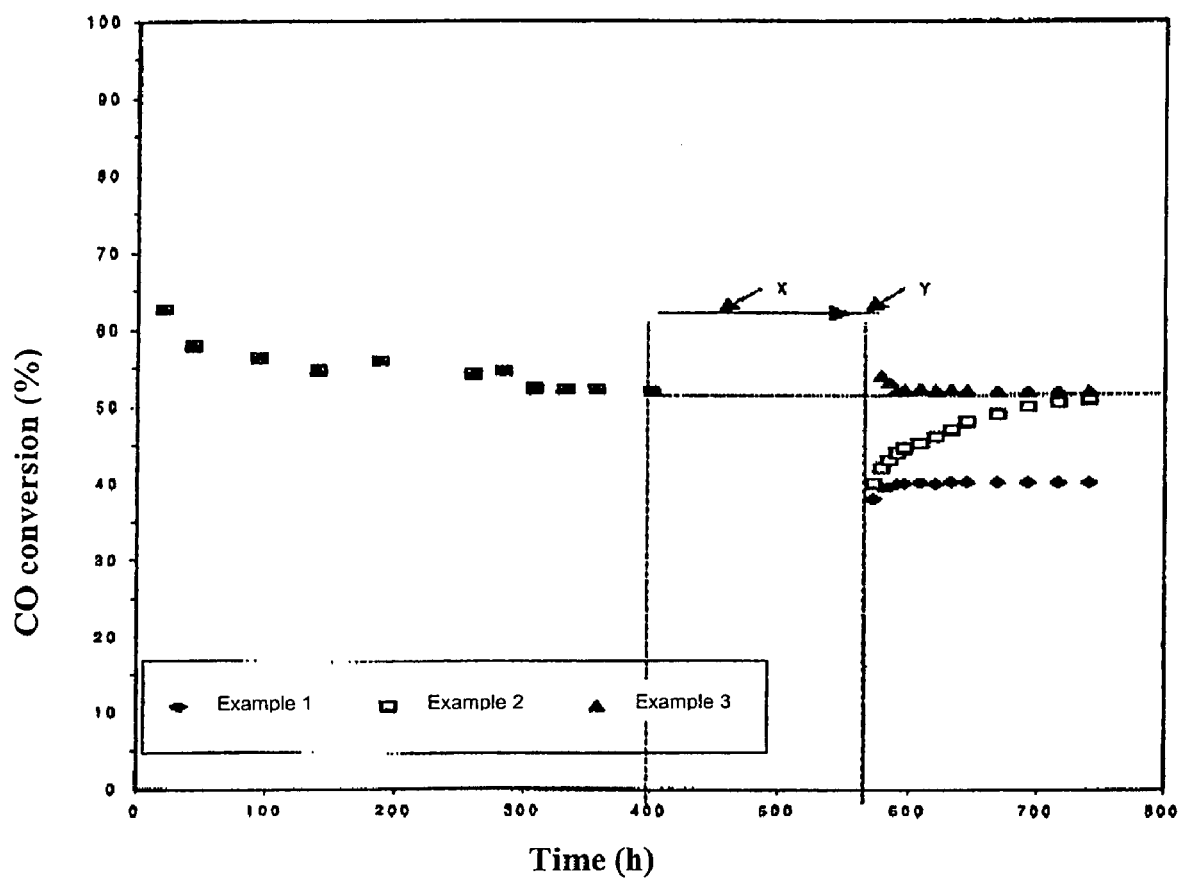

a) during the step for interrupting the reaction, supply of the feed is stopped, and a blanket of an inhibiting gas comprising less than 1% by volume of hydrogen and at least 5% by volume of at least one inhibiting compound selected from the group formed by carbon monoxide and water is established; and b) during the reaction restart step, in the reaction zone, a blanket of an activating gas with a hydrogen content of at least 20% by volume is established and supply of the feed is restarted.

16 Claims, 1 Drawing Sheet

METHOD FOR TEMPORARILY INTERRUPTING A FISCHER-TROPSCH REACTION IN A THREE-PHASE BED REACTOR

FIELD OF THE INVENTION

The invention relates to the field of processes for producing liquid hydrocarbons comprising a Fischer-Tropsch synthesis step. More particularly, it relates to a process for temporarily interrupting a Fischer-Tropsch type reaction comprising a step for interrupting the reaction and a step for restarting said reaction.

PRIOR ART

The synthesis of hydrocarbons from a mixture comprising carbon monoxide and hydrogen, more commonly known as synthesis gas, has been known for a long time.

In particular, the work of F Fischer and H Tropsch may be cited who, in 1923, gave their names to the chemical transformation known as the Fischer-Tropsch synthesis. The Fischer-Tropsch synthesis is a reaction which can synthesize liquid paraffinic or olefinic hydrocarbons and/or oxygen-containing derivatives thereof from a synthesis gas, the latter being obtained, for example, from natural gas or coal. Said reaction, which was exploited on an industrial scale in Europe during the Second World War and also in South Africa from the 1950s, became hugely popular again in the 1980s and 1990s due to changes in the price of oil and gas, and also due to environmental reasons.

One of the skilled person's headaches when using such processes is coping with any problems by temporarily interrupting the reaction process, while avoiding reducing the performance of the catalyst used when restarting said process.

U.S. Pat. No. 6,512,017 presents a method for handling a catalyst for a reactor comprising a catalyst in suspension, commonly known as a "slurry bed reactor" or "slurry", including charging the catalyst into the reactor, startup, stopping and discharging said catalyst when subsequent use of said catalyst is envisaged. It is indicated that that type of reactor has to be operated with as few interruptions as possible to maintain an acceptable level of catalyst performance and to minimize its degradation over time. More particularly, that patent describes procedures for stopping and restarting which act on the synthesis gas supply, the reactor temperature and the internal reactor recycle.

One aim of the invention is to provide a process for temporarily interrupting the Fischer-Tropsch type reaction without having to discharge and recharge the catalyst.

The invention also proposes a process which, during a temporary interruption of the reaction, can maintain the stability of the Fischer-Tropsch catalyst performances, i.e.:
 maintain the catalytic properties, such as the activity and selectivity; and
 maintain the mechanical properties, and in particular minimize catalyst attrition.

The invention also aims to propose a process for temporary interruption which can allow the Fischer-Tropsch reaction to be restarted rapidly.

SUMMARY OF THE INVENTION

The invention pertains to a process for temporarily interrupting a Fischer-Tropsch reaction carried out in a three-phase reactor, usually a reactor comprising a catalyst in suspension (slurry) or a slurry bubble column, which allows the reaction to be stopped without discharging the catalyst, can maintain the performance and stability of the catalyst at an acceptable level and can allow rapid restarting of the reaction.

The process of the present invention comprises a step for interrupting the reaction and a step for restarting said reaction, during which steps the solid catalyst particles are maintained in suspension in the reaction zone. During the interruption step, supply of the feed is stopped, and a blanket of an inhibiting gas comprising less than 1% by volume of hydrogen and at least 5% by volume of at least one inhibiting compound selected from the group formed by carbon monoxide and water is established. During the restart step, a blanket of an activating gas with a hydrogen content of at least 20% by volume is established, and supply of the feed is restarted.

BRIEF DESCRIPTION OF FIG. 1

FIG. 1 shows, in the context of Examples 1 to 3, an illustration of the change in carbon monoxide conversion with time during the reaction phase, the reaction interruption phase and the restart phase.

DETAILED DESCRIPTION OF THE INVENTION

Thus, the invention pertains to a process for temporarily interrupting a Fischer-Tropsch type reaction carried out on a feed comprising at least carbon monoxide and hydrogen in a three-phase reaction zone comprising a liquid phase, a gas phase and solid catalyst particles maintained in suspension, said process comprising a step a) for interrupting the reaction and a step b) for restarting said reaction, during which the solid catalyst particles are maintained in suspension in the reaction zone;

a) during the step for interrupting the reaction,
 supply of the feed is stopped; and
 a blanket of an inhibiting gas comprising less than 1% by volume of hydrogen and at least 5% by volume of at least one inhibiting compound selected from the group formed by carbon monoxide and water is established; and
b) during the reaction restart step:
 in the reaction zone, a blanket of an activating gas with a hydrogen content of at least 20% by volume is established; and
 supply of the feed is restarted.

The term "three phase bed" means a zone comprising a liquid phase, a gas phase and a solid phase, in this case the catalyst, in which the solid is maintained in suspension. It may, for example, be a fluidized bed or an ebullated bed.

Preferably, the three phase bed is a "slurry" type bed. This type of bed corresponds, for example, but not uniquely, to that employed in a slurry bubble column, in which the solid particles are generally distributed over the whole depth of the bed. A further type of "slurry" reactor is a perfectly stirred autoclave which generally employs mechanical stirring.

Association of step a) for interrupting the reaction and step b) for restarting said reaction as described above can maintain constant the catalytic performance of the catalyst during the reaction restart, i.e. substantially identical to that of the catalyst prior to interrupting the reaction. This association of two steps, interruption and restarting, can also avoid degradation of the catalyst during said reaction interruption period, increasing the rate of reaction restart, and minimize the duration of the transitional restart phase.

It has been discovered that the nature of the compound inhibiting the reactions and thus the active sites of the catalyst and its content in the inhibiting gas influence protection of the active sites in the solid catalyst particles. Without wishing to be bound by a particular theory, the inhibiting compounds in question, namely carbon monoxide and water, have, a priori, an affinity for the catalytic sites and tend to become readily adsorbed on the catalytic sites of the solid catalyst particles. It thus appears that said inhibiting compounds have, when used in accordance with the process of the invention, a protective function which can prevent or minimize any irreversible degradation of the active sites of the catalyst.

Furthermore, it had been observed that the active sites which have been temporarily inhibited or neutralized and protected by exposure to said inhibiting compounds are more readily or more rapidly reactivated as soon as they are brought into the presence of hydrogen. Further, the reactivated catalysts have shown performances close to the performances obtained before interrupting the reaction, or even higher.

According to the invention, the amount of inhibiting compounds in the inhibiting gas is more than 5% by volume. Preferably, the amount of inhibiting compounds in the inhibiting gas is more than 10% by volume, more preferably more than 20% by volume.

The blanket of inhibiting gas may be maintained at an absolute pressure of 0.1 to 10 MPa, preferably 1 to 5 MPa. The ratio between the partial pressure of the inhibiting compounds and the pressure of the blanket of inhibiting gas may advantageously be more than 0.05, preferably more than 0.1, more preferably more than 0.2.

In a preferred mode of the invention, the inhibiting gas comprises at least carbon monoxide.

In a further preferred mode of the invention, the inhibiting gas comprises at least water. In this case, the partial pressure of water in the inhibiting gas is preferably less than 0.1 MPa, more preferably less than 0.05 MPa.

The inhibiting gas of the invention may optionally comprise a mixture of water and carbon monoxide.

The step a) for interrupting the reaction comprises, in the process of the invention, stopping supply of the feed and establishing a blanket of inhibiting gas. These two sub-steps of step a) may be carried out in any order or simultaneously.

There is more than one way of carrying out step a) of the process of the invention. As an example, the blanket of inhibiting gas may be established by injecting a gas the initial composition of which agrees with a hydrogen content of less than 1% by volume and an amount of inhibiting compound of at least 5% by volume. Said blanket of inhibiting gas may also be established by recycling a gaseous effluent from the reaction zone under conditions such that hydrogen is consumed by more rapid reaction than the carbon monoxide, which results in the establishment of a blanket of gas the composition of which agrees with a hydrogen content of less than 1% by volume and an inhibiting compound content of at least 5% by volume.

During step a), the solid catalyst particles in suspension in the reaction zone may be maintained as follows:
  by the flow rate of the feed, before stopping its supply;
  by the flow rate of the inhibiting gas; and/or
  as appropriate, by an internal recycle of at least a portion of a gaseous effluent to a lower portion of the reaction zone.
In one implementation of the invention, during step a):
  supply of the feed is halted;
  the inhibiting gas is sent to the reaction zone; and
  the solid catalyst particles are maintained in suspension in the reaction zone by means of said inhibiting gas.

The process of the invention may advantageously include a recycle which is internal to or external of the reactor, in which at least part of the gas phase from the reaction zone is recycled to a lower portion of said reaction zone.

Generally, the gas phase from the reaction zone is sent to a condensation step then to a separation step. The recycle then consists of recycling at least part of the gaseous effluent from the separation step to a lower part of the reaction zone. Said recycle is generally external, but internal separation in the reaction zone and internal reaction to said zone are also possible.

In one implementation of a process comprising an (internal or external) recycle during step a):
  supply of the feed is halted;
  the inhibiting gas is sent to the reaction zone, while maintaining the gas phase recycle or the gaseous effluent recycle to a lower portion of the reaction zone until the inhibiting gas blanket is established; and
  the solid catalyst particles are maintained in suspension by maintaining the inhibiting gas recycle a lower portion of the reaction zone.

In a further implementation of a process comprising an (internal or external) recycle, during step a):
  as appropriate, the ratio of the quantity of hydrogen to the quantity of carbon monoxide in the feed, $H_2/CO$, is adjusted to a value which is lower than that of the usage ratio of the reaction;
  supply of the feed is halted while maintaining the recycle of the gas phase or the gaseous effluent from the reaction zone to the lower part of said reaction zone until the inhibiting gas blanket is established; and
  the solid catalyst particles are maintained in suspension by maintaining the reaction of the inhibiting gas to a lower portion of the reaction zone.

In this type of process, the usage ratio is generally defined as the stoichiometric ratio between hydrogen and carbon monoxide consumed by the Fischer-Tropsch synthesis. The usage ratio is generally variable. This ratio may depend on the nature of the catalyst and on the operating conditions used during synthesis. Said usage ratio may change over time as a function, for example, of the stability of the catalyst. Said usage ratio may also change by the selectivity of the catalyst. As an example, in the case of a Fischer-Tropsch process using a cobalt-based catalyst to produce long chain paraffinic hydrocarbons, the usage ratio is generally in the range 2.0 to 2.3.

The amplitude of the reduction of the $H_2/CO$ ratio produced during step a) may influence the rate of production of a gas blanket the composition of which agrees with a hydrogen content of less than 1% by volume and an inhibiting compound content of at least 5% by volume. The greater the reduction in the amplitude of the $H_2/CO$ ratio, the faster the gas inhibitor blanket is established.

The restart step b) of the reaction comprises, in accordance with the process of the invention, establishing a blanket of activating gas and restarting the feed supply. These sub-steps of step b) are generally carried out in that order.

Preferably, establishing the blanket of activating gas and restarting the supply of feed are two successive sub-steps in step b). However, it is possible to use the feed (synthesis gas) as the activating gas. Step b) would then comprise no sub-steps, but only steady re-introduction of said feed. The activating gas blanket may be maintained for a period which may last up to several days, before restarting the feed supply. Generally, the period for maintaining the activating gas blanket is linked to the duration of step a), the reaction interruption. This duration for maintaining the activating gas blanket is preferably in the range $1/100^{th}$ to $1/2$ the reaction interruption period. It is generally in the range 0.1 to 100 hours.

During step b), the solid catalyst particles may be maintained in suspension in the reaction zone by the following:
the activating gas flow;
the feed flow, after re-establishing its supply; and/or
as appropriate, by an internal or external recycle of at least part of the gas phase to the lower portion of the reaction zone.

Preferably, the hydrogen content in the activating gas of step b) is more than 20% by volume, more preferably more than 50% by volume, and still more preferably more than 80% by volume.

During steps a) and b), the hourly space velocity HSV, i.e. the ratio between the hourly flow rate of the gas (feed, inhibiting gas or activating gas) and the catalyst volume, may be in the range 1 to 400 $h^{-1}$. The gas flow rate must generally be sufficient to maintain the catalyst in suspension in the reaction zone. Depending on the density of the solid catalyst particles and their concentrations, the minimum gas flow rate is generally more than 1 cm/s, preferably more than 5 cm/s.

The temperature and pressure conditions in the reaction zone before interruption or after restart are variable and adapted to the catalyst employed.

The reaction temperature, i.e. before step a) or after step b), may generally be in the range 200° C. to 400° C.

In a particular implementation of the process of the invention, during step a), the temperature in the reaction zone is reduced from an initial value to a value of over 180° C., and during step b), the temperature in the reaction zone is increased to a value approximately equal to or above the initial value. Preferably, said temperature is higher by at least 10° C. and usually 15° C. to 25° C. higher than the initial value.

Preferably, during step a), the temperature in the reaction zone is reduced to a value of more than 180° C. and less than or equal to 220° C.

The reaction pressure, i.e. prior to step a) or after step b), may be in the range 0.1 to 10 MPa. Said pressure may be maintained during step a) or b).

However, in general, the pressure in the reaction zone during steps a) and b) is generally reduced to a pressure below the reaction pressure, preferably by at least 0.05 MPa, or even 0.1 MPa. It is also possible to increase the pressure in the reaction zone during step b), preferably by at least 0.05 MPa.

The catalyst employed in the reaction zone is generally any solid catalyst which is known to the skilled person for carrying out the Fischer-Tropsch synthesis. Preferably, the catalyst is based on cobalt or iron, more preferably based on cobalt.

The catalyst employed in the reaction zone is generally a supported catalyst. The support may, for example, be based on alumina, silica or titanium.

The reaction zone may also comprise a silicone-based antifoaming agent.

The process of the invention is completely compatible with the use of an anti-foaming agent, which may have a deleteriously and occasionally irreversible effect on catalyst performance. The process of the invention can maintain the catalytic properties of the catalyst when the reaction is interrupted, and allows the catalytic performance to recover rapidly during restart of the reaction, even in the presence of an anti-foaming agent.

EXAMPLE 1

Not in Accordance with the Invention

A Fischer-Tropsch synthesis reaction was carried out in an autoclave type reactor with a 1 litre volume containing 60 $cm^3$ of catalyst with a synthesis gas comprising hydrogen and carbon monoxide. The Fischer-Tropsch reaction was carried out at 220° C. and 2 MPa, in the presence of a catalytic solid containing 12% by weight of cobalt on a silica-alumina support and a silicone-based antifoaming agent from the Rhodorsil© range sold by RHODIA. The space velocity was 1700 litres per litre of catalyst per hour (Nl/l·h).

After 400 hours of operation, the Fischer-Tropsch reaction was interrupted (part marked by the arrow "X" in FIG. 1). During this reaction interruption phase, the supply of synthesis gas to the reactor was stopped and simultaneously replaced by supplying, for one week, a $H_2/N_2$ gas comprising 50% by volume of hydrogen and 50% by volume of nitrogen. The mixture in the reaction zone containing the Fischer-Tropsch catalyst was maintained at a temperature of 200° C., a pressure of 2 MPa and a space velocity of 1200 Nl/l·h.

At the end of the stop period, the Fischer-Tropsch reaction was restarted by replacing the $H_2/N_2$ gas supply with synthesis gas and increasing the space velocity to 1700 Nl/l·h. The reactor temperature was steadily increased to 220° C. over 3 hours.

The catalyst performance was followed by analyzing the gaseous effluent at the reactor outlet, to determine the degree of carbon monoxide conversion, the activity and the selectivity for methane and hydrocarbons containing 5 or more carbon atoms, C5+.

The curve 1 of FIG. 1, representing the change in carbon monoxide conversion with time, shows that this conversion was considerably reduced on restarting the reaction at the end of the stop period. Said conversion was maintained at a reduced level even after restarting. This curve is witness to a marked and irreversible degradation of the catalyst.

Further, Table 1 below shows that the C5+ activity and selectivity were irretrievably degraded.

EXAMPLE 2

In Accordance with the Invention

The initial synthesis conditions of Example 1 were reproduced.

After 400 hours of operation, the Fischer-Tropsch reaction was interrupted (part marked by the arrow "X" in FIG. 1). During this reaction interruption phase, the supply of synthesis gas to the reactor was stopped and simultaneously replaced by supplying, for one week, a $CO/N_2$ inhibiting gas comprising 50% by volume of carbon monoxide and 50% by volume of nitrogen. In the same manner as described for Example 1, the mixture in the reaction zone, containing the Fischer-Tropsch catalyst, was maintained at a temperature of 200° C., a pressure of 2 MPa and a space velocity of 1200 Nl/l·h.

At the end of the stop period, the Fischer-Tropsch reaction was restarted by steadily replacing (over 2 hours) the $CO/N_2$ gas supply with synthesis gas and increasing the space velocity to 1700 Nl/l·h. The reactor temperature was steadily increased to 220° C. over 3 hours.

As was described for Example 1, the catalyst performance was monitored by analyzing the gaseous effluent at the reactor outlet.

Curve 2 of FIG. 1, representing the change in carbon monoxide conversion over time, shows that this conversion was initially reduced during the restart phase before steadily returning to its initial level more than 100 hours after the restart.

Table 1 shows a loss of C5+ activity and selectivity at the onset of the restart, but the activity and selectivity recovered to a level equivalent to that prior to interrupting the reaction a little more than a hundred hours after restarting.

EXAMPLE 3

In Accordance with the Invention

The initial synthesis conditions of Example 1 were reproduced in the same reactor with the same catalyst.

After 400 hours of operation, the Fischer-Tropsch reaction was interrupted (part marked by the arrow "X" in FIG. 1) in the same manner as described for Example 2, i.e. with a $CO/N_2$ inhibiting gas comprising 50% by volume of carbon monoxide and 50% by volume of nitrogen. In the same manner as described for Examples 1 and 2, the mixture in the reaction zone, containing the Fischer-Tropsch catalyst, was maintained at a temperature of 200° C., a pressure of 2 MPa and a space velocity of 1200 Nl/l·h.

At the end of the stop period, the Fischer-Tropsch reaction was restarted by replacing the $CO/N_2$ gas supply with an activating gas containing essentially hydrogen for a period of 5 hours (supplemental treatment marked by the dotted line "Y" in FIG. 1).

The synthesis gas was then supplied, the reactor temperature being steadily increased to 220° C. over 3 hours and increasing the space velocity to 1700 Nl/l·h.

As was described for Examples 1 and 2, the catalyst performance was monitored by analyzing the gaseous effluent at the reactor outlet.

Curve 3 of FIG. 1, representing the change in carbon monoxide conversion with time, shows that from the beginning of the restart phase, this conversion was at a level equivalent to that prior to interrupting the reaction.

Further, Table 1 shows that the activity and selectivity are not degraded and that the restart was carried out rapidly with a minimal transitional period.

TABLE 1

|  | Example 1 | Example 2 | Example 3 |
|---|---|---|---|
| Activity (a u) | | | |
| 400 h | 1 | 1 | 1 |
| 600 h | 0.77 | 0.86 | 1 |
| 700 h | 0.77 | 0.96 | 1 |
| Methane selectivity (a u) | | | |
| 400 h | 1 | 1 | 1 |
| 600 h | 1.5 | 1.4 | 1 |
| 700 h | 1.5 | 1.05 | 1 |
| C5+ selectivity (a u) | | | |
| 400 h | 1 | 1 | 1 |
| 600 h | 0.83 | 0.89 | 1 |
| 700 h | 0.83 | 0.98 | 1 |

Re-injection of synthesis gas (restart of the FT reaction) at about 570 h (568 h in Examples 1 and 2,573 h in Example 3).

The invention claimed is:

1. A process for temporarily interrupting a Fischer-Tropsch type reaction carried out on a feed comprising at least carbon monoxide and hydrogen in a three-phase reaction zone comprising a liquid phase, a gas phase and solid catalyst particles maintained in suspension, said process comprising a step a) for interrupting the reaction and a step b) for restarting said reaction, during which the solid catalyst particles are maintained in suspension in the reaction zone;

a) during the step for interrupting the reaction, supply of the feed is stopped; and a blanket of an inhibiting gas comprising less than 1% by volume of hydrogen and at least 5% by volume of at least one inhibiting compound selected from the group formed by carbon monoxide and water is established; and b) during the reaction restart step:

in the reaction zone, a blanket of an activating gas with a hydrogen content of at least 20% by volume is established; and supply of the feed is restarted.

2. A process according to claim 1, in which the three-phase bed is a "slurry" type bed.

3. A process according to claim 1, in which the amount of inhibiting compounds in the inhibiting gas is more than 10% by volume.

4. A process according to claim 1, in which the inhibiting gas comprises at least carbon monoxide.

5. A process according to claim 1, in which the inhibiting gas comprises at least $H_2O$.

6. A process according to claim 5, in which the partial pressure of $H_2O$ in the inhibiting gas is less than 0.1 MPa.

7. A process according to claim 1, in which during step a):

supply of the feed is halted;

the inhibiting gas is sent to the reaction zone; and the solid catalyst particles are maintained in suspension in the reaction zone by means of said inhibiting gas.

8. A process according to claim 1, in which at least part of the gas phase from the reaction zone is recycled to a lower part of said reaction zone.

9. A process according to claim 8, in which, during step a):

supply of the feed is halted;

the inhibiting gas is sent to the reaction zone while maintaining the gas phase recycle to a lower portion of the reaction zone until the inhibiting gas blanket is established; and the solid catalyst particles are maintained in suspension in the reaction zone by maintaining the inhibiting gas recycle to a lower portion of the reaction zone.

10. A process according to claim 8, in which, during step a):

as appropriate, the ratio of the quantity of hydrogen to the quantity of carbon monoxide in the feed, $H_2/CO$, is adjusted to a value which is lower than that of the usage ratio of the reaction;

supply of the feed is halted while maintaining the recycle of the gas phase or the gaseous effluent from the reaction zone to the lower portion of said reaction zone until the inhibiting gas blanket is established; and the solid catalyst particles are maintained in suspension by maintaining the recycle of the inhibiting gas to a lower portion of the reaction zone.

11. A process according to claim 1, in which establishing the blanket of the activating gas and restarting the supply of the feed are two successive steps of step b).

12. A process according to claim 1, in which the amount of hydrogen in the activating gas of step b) is more than 20% by volume.

13. A process according to claim 1, in which, during step a), the temperature in the reaction zone is reduced from an initial value to a value of more than 180° C. and, during step b), the temperature in the reaction zone is increased to a value approximately equal to or higher than the initial value.

14. A process according to claim 13 in which, during step a), the temperature in the reaction zone is reduced to a value of more than 180° C. and 220° C. or less.

15. A process according to claim 1, in which the catalyst comprises cobalt.

16. A process according to claim 1, in which the reaction zone further comprises a silicone-based antifoaming agent.

* * * * *